(12) United States Patent
Murata

(10) Patent No.: US 8,300,992 B2
(45) Date of Patent: Oct. 30, 2012

(54) OPTICAL MODULATOR HAVING MACH-ZENDER ARRANGEMENT AND METHOD TO GENERATE MODULATED OPTICAL SIGNAL USING THE SAME

(75) Inventor: Michio Murata, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 248 days.

(21) Appl. No.: 12/887,131

(22) Filed: Sep. 21, 2010

(65) Prior Publication Data

US 2011/0069924 A1    Mar. 24, 2011

(30) Foreign Application Priority Data

Sep. 24, 2009  (JP) .................................. 2009-219480

(51) Int. Cl.
*G02F 1/035*  (2006.01)
(52) U.S. Cl. .................. 385/3; 385/2; 977/834; 977/755
(58) Field of Classification Search .................. 385/2, 3; 977/834, 755
See application file for complete search history.

(56) References Cited

U.S. PATENT DOCUMENTS

| | | | | |
|---|---|---|---|---|
| 5,074,631 A | * | 12/1991 | Hamano et al. | 385/3 |
| 5,408,544 A | * | 4/1995 | Seino | 385/3 |
| 5,455,876 A | * | 10/1995 | Hopfer et al. | 385/2 |
| 6,310,700 B1 | * | 10/2001 | Betts | 359/2 |
| 6,646,776 B1 | * | 11/2003 | Cheung et al. | 359/254 |
| 7,408,693 B2 | * | 8/2008 | Kissa et al. | 359/245 |
| 7,522,783 B2 | * | 4/2009 | Glebov et al. | 385/2 |
| 2008/0170818 A1 | * | 7/2008 | Kissa et al. | 385/2 |

FOREIGN PATENT DOCUMENTS

| | | |
|---|---|---|
| JP | 9-90301 | 4/1997 |
| JP | 2003-322831 | 11/2003 |

* cited by examiner

*Primary Examiner* — Ellen Kim
(74) *Attorney, Agent, or Firm* — Smith, Gambrell & Russell, LLP

(57) ABSTRACT

A semiconductor optical modulator with the Mach-Zender type is disclosed. The optical modulator of the invention cab driven by a single phase signal and reduce the chirping of the modulated light. Two waveguides of the Mach-Zender modulator each including an active layer showing the exciton resonance in the refractive index are connected with a resistor. The driving signal is applied to one of the waveguides, while, the signal is applied to the other waveguide through the resistor where the other waveguide is grounded through a resistor. Adjusting the resistance of two resistors and the amplitude of the applied signal, the Mach-Zender modulator shows a substantial modulation degree with substantially no chirping characteristic.

12 Claims, 10 Drawing Sheets

Applied Signal ized with respect to the bias voltage applied to the respec-

OPTICAL MODULATOR HAVING MACH-ZENDER ARRANGEMENT AND METHOD TO GENERATE MODULATED OPTICAL SIGNAL USING THE SAME

BACKGROUND OF THE INVENTION

1. Field of the Invention

The present invention relates to an optical modulator having the Mach-Zender type and a method to generate modulated light using this modulator.

2. Related Prior Arts

A Japanese Patent published as JP-H09-090301A has disclosed a method to generate an optical signal modulated with a Mach-Zender modulator. The method disclosed therein first divides the input light into two branched light and each branched light enters in the first and second waveguides. The respective waveguides provide an electrode thereon, one of which is coupled with a signal source, while, the other of which is grounded. The waveguide biased by a modulating signal, the phase of the light propagating therein advances or delays; accordingly, the output of the modulator which multiplexes two beams each propagating the first and second waveguides may be switched depending on the bias level applied to the first electrode and a length of the electrode.

The modulator with the arrangement disclosed in the prior patent above causes the phase shift only for the light propagating in the first waveguide, which inevitably causes a drift of the wavelength, namely, the chirping in the multiplexed light. Accordingly, a transmission distance is limited as a matter of course.

Another Japanese Patent Application published as JP-2003-322831A has disclosed an advanced modulator with the Mach-Zender arrangement for eliminating the chirping. The modulator disclosed therein has also two waveguides each providing an electrode. However, this modulator applies the electrical signal to both electrodes but in the differential mode. That is, the first electrode on the first waveguide is driven by the signal, and the second electrode on the second waveguide is driven by the other signal whose phase is opposite to the former signal. Such an arrangement of the Mach-Zender modulator, not only the modulation efficiency but the chirping performance may be enhanced.

SUMMARY OF THE INVENTION

An aspect of the present invention relates to a semiconductor optical modulator with the Mach-Zender type. The optical modulator of the invention may have a semiconductor substrate, an optical de-coupler, an optical coupler, and first and second waveguides each formed on the semiconductor substrate and optically coupled with the optical de-coupler and the optical coupler in respective ends thereof. The optical modulator of the present invention may further have a first resistor and a second resistor. The first resistor may connect the first waveguide with the second waveguide, while, the second resistor may ground the second waveguide. A feature of the optical modulator of the invention is that the first waveguide is provided with a driving signal with a first bias voltage, while, the second waveguide is biased by a second bias voltage generated by a resistive divided constituted of the first and second resistors.

The first and second waveguides may include a multi-quantum well structure with a layer arrangement common to both waveguides, but the first waveguide is biased in a region where the refractive index of the first waveguide shows the negative dependence on the first bias voltage, while, the second waveguide is biased in a second region where the refractive index thereof shows the positive dependence on the second bias voltage. Thus, the optical modulator of the present invention may show an enough modulation degree even when the optical modulator is driven with a signal phase signal.

The first and second waveguides of the present invention may have an active layer common to both waveguides with a multi-quantum well structure, specifically, the active layer has the five-layer asymmetric coupled quantum well structure including at least three well layers, two of which has a summed thickness that is substantially equal to a thickness of rest well layer. The arrangement of the multi-quantum well structure involved in the waveguides of the invention may show a peak characteristic in the refractive index with respect to the bias voltage. The first bias voltage may be set in the negative slope side of the peak, while, the second bias voltage may be set in the positive slope side.

The first resistor provided in the optical modulator of the present invention may be integrally formed on the semiconductor substrate. The first resistor may be a thin film resistor integrally formed on the semiconductor substrate.

The optical modulator of the present invention may further provide an additional electrode on at least one of the first and second waveguides. The additional electrode, by supplying with another bias voltage, may shift the phase of the light propagating in the waveguide that is formed with the additional electrode. The output light coupled in the optical coupler may enhance the modulation degree by adjusting the phase of the light.

Another aspect of the present invention relates to a method to modulate light by a semiconductor optical modulator that provides an optical de-coupler, an optical coupler first and second waveguides each optical coupled with the optical de-coupler and the optical coupler in respective ends thereof, a first resistor connecting the first waveguide with the second waveguide, and a second resistor grounding the second waveguide. The method of the present invention may comprise steps of:

(a) generating first and second light each de-coupled by the optical de-coupler from incident light. The first light is provided to the first waveguide, while, the second light is provided to the second waveguide;

(b) applying a first bias voltage to the first waveguide to generate the third light, and a second bias voltage to the second waveguide to generate the fourth light; and (c) generating output light by coupling the third light with the fourth light by the optical coupler.

A feature of the present method is that the second bias voltage is generated from the first bias voltage by a resistive divider constituted of the first and second resistors, where the first resistor connects the first waveguide with the second waveguide, while, the second resistor grounds the second waveguide. Because two waveguides of the present optical module are thus configured, the optical modulator of the present invention may be driven with the signal driving signal without any differential signals.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF PREFERRED EMBODIMENTS

Spirits of the present invention will be further recognized by referring to accompanying drawings presented as examples thereof. Next, preferred embodiments according to the present invention will be described as referring to drawings. In the description of the drawings, the same elements will be referred by the same symbols or the same numerals without overlapping explanations.

Figure 1:
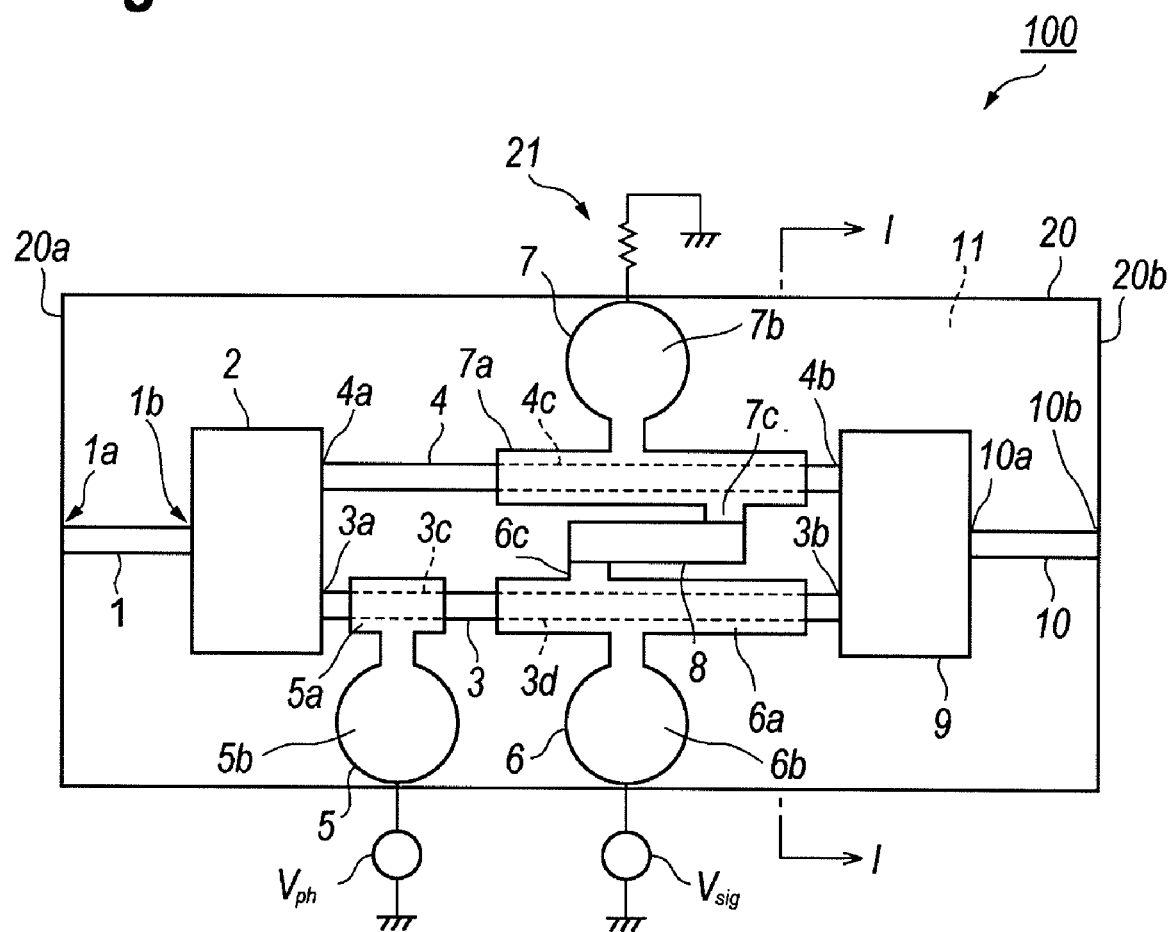
FIG. 1 is a plan view schematically showing an optical modulator according to an embodiment of the invention.

FIG. 1 is a plan view schematically showing an optical modulator according to an embodiment of the invention. The optical modulator 100 shown in FIG. 1 comprises a semiconductor modulator 20 with the arrangement of the Mach-Zender type, two voltage sources, $V_{Ph}$ and $V_{sig}$, and a second resistor 21.

The optical modulator 20 includes an input waveguide 1, an optical de-coupler 2, first and second waveguides, 3 and 4, an electrode 5 for shifting the phase of the light, first and second electrodes, 6 and 7, a first resistor 8, an optical coupler 9, and an output waveguide 10. These elements of the modulator 20 are formed on a semiconductor substrate 11. One end 1a of the input waveguide is exposed to the end 20a of the Mach-Zender modulator 20 and may be optically coupled with, for instance, an external optical fiber or another semiconductor optical device. The other end 1b of the input waveguide 1 continues to the optical de-coupler 2. Thus, the input waveguide 1 provides light entering the end 1a thereof to the de-coupler 2 from the other end 1b.

The optical de-coupler 2 is configured to divide the light entering from the end 1b of the input waveguide 1 into two light beams, and to provide these light beams to the first and second waveguides, 3 and 4, respectively. The optical de-coupler 2 may be a type of the multimode interference device. The first waveguide 3 has two ends, 3a and 3b, one end 3a of which continues the optical de-coupler 2, while, the other end 3b continues to the optical coupler 9. The first waveguide 3 comprises the first and second regions, 3c and 3d, the former of which is put between the end 3a and the second region 3d, and has a relatively shorter length. While, the latter region 3d, which is put between the first region 3c and the other end 3b, has a relatively longer length. The first waveguide 3 provides one of divided light beams from the end 3a to the other end 3b.

The second waveguide 4 includes two ends, 4a and 4b, the former of which continues the optical de-coupler 2, while, the latter continues the optical coupler 9. The second waveguide 4 extends substantially in parallel to the first waveguide 3. The second waveguide 4 includes the first region 4c with a relatively longer length. This first region 4c may be arranged to be in parallel, to have a length substantially same with that of the second region 3d and to position corresponding to the second region 3d of the first waveguide 3. The second waveguide 4 thus arranged provides the other of divided light beams coming from the optical de-coupler 2 at one end 4a to the other end 4b.

The electrode 5 for shifting the phase of the divided light beam includes a striped region 5a and a pad 5b. The striped region 5a covers the first region 3c of the first waveguide 3. The electrode 5, which is connected to the voltage source $V_{ph}$, applies the bias voltage to the first region 3c. The voltage source $V_{ph}$ is grounded by a terminal opposite to that connected to the electrode 5.

The first electrode 6, which is formed on the second region 3d of the first waveguide 3, also includes a striped region 6a, a pad 6b and an extracted region 6c. The striped region 6a has a rectangular shape extending along the direction of the first waveguide 3 and covers the second region 3d of the first waveguide 3. The extracted region 6c extends along a direction connecting the first waveguide 3 with the second waveguide 4. The first electrode 6 is coupled with the other voltage source $V_{sig}$, and applies the signal $V_{sig}$ to the second region 3d. The voltage source $V_{sig}$ is grounded in a terminal opposite to that connected the pad 6b.

The second electrode 7, which is put on the first region 4c of the second waveguide 4, also includes a striped region 7a, a pad 7b, and an extracted region 7c. The striped region 7a, which has a rectangular shape extending along the axis of the second waveguide 4, covers the first region 4c of the second waveguide 4. The striped region 7a has a length substantially equal to the first electrode 6a, is arranged in parallel thereto, and is formed in a position corresponding to the first electrode 6a. The extracted region 7c extends along the direction of the extracted region 6c of the first electrode 6. The second electrode 7 is grounded through the pad 7b and the resistor 21. The second electrode 7 applies a second signal to the first region 7a of the second waveguide 4. These first and second electrodes, 6 and 7, may be made of stacked metal of titanium (Ti), platinum (Pt) and gold (Au).

The first resistor 8 is put between the first and second electrodes, 6 and 7 and connected to the extracted regions, 6c and 7c. The first resistor 8 may be made of alloy of nickel (Ni) and chromium (Cr) and have an arrangement of thin film resistor integrally formed on the semiconductor substrate 20.

The optical coupler 9 couples the light beams each provided from the first and second electrodes, 3 and 4, and provides the coupled light to the output waveguide 10. The optical coupler may be a type of the multi-mode interference device. The output waveguide 10 includes one end 10a coupled with the optical coupler 9, and the other end 10b exposed in the end of the Mach-Zender modulator 20. This end 10b may be coupled with an external fiber or another semiconductor optical device. The output waveguide 10 provides the coupled light coming from the optical coupler 9 to the other end 10b of the modulator 20.

Figure 2:
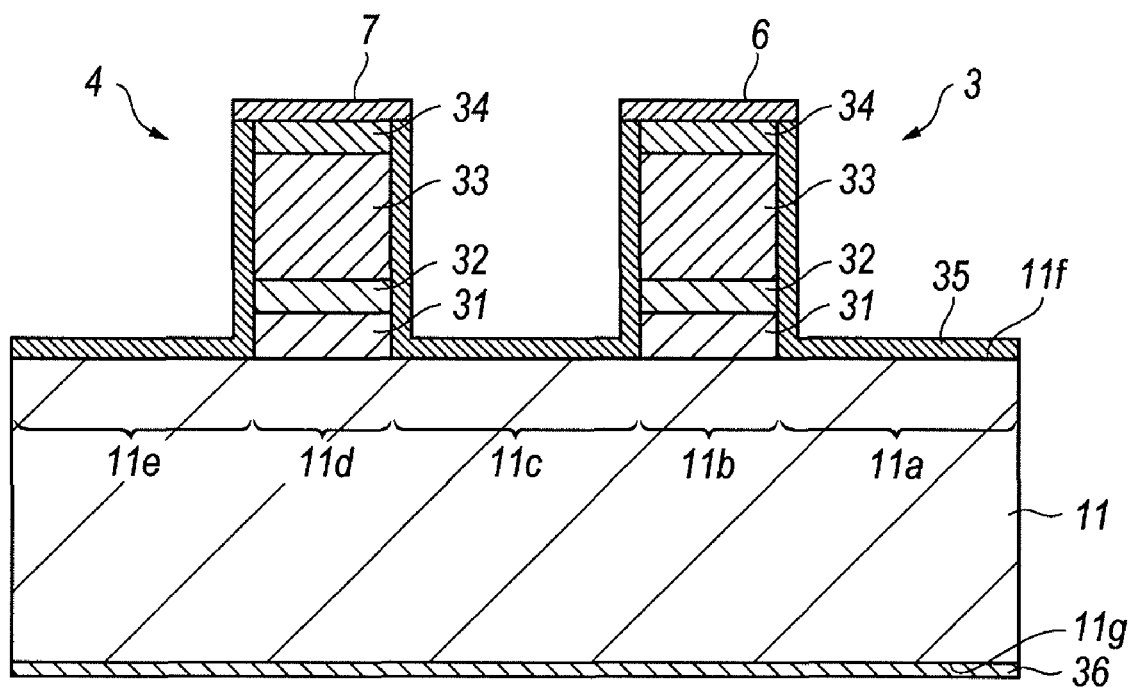
FIG. 2 shows a cross section of the optical modulator shown in FIG. 1, where the cross section is taken along the line I-I illustrated in FIG. 1.

Next, a material structure of the Mach-Zender modulator 20 will be described as referring to FIG. 2, which is a cross section of the modulator device 20 taken along the line I-I appeared in FIG. 1. As illustrated in FIG. 2, the modulator 20 comprises a semiconductor substrate 11, and first to fifth regions, 11a to 11e. The substrate 11 may be an n-type semiconductor, such as indium phosphide (InP) doped with tin (Sn). The first waveguide 3 comprises a stack of a lower cladding layer 31, an active layer 32, an upper cladding layer 33 and a contact layer 34. These layers, 31 to 34, are stacked on the second region 11b of the substrate 11 along the normal line of the primary surface 11f of the substrate. The second waveguide 4 also comprises a lower cladding layer 31, an active layer 32, an upper cladding layer 33 and a contact layer 34, where these layers, 31 to 34, are stacked on the fourth region 11d along the normal line of the primary surface 11g of the substrate 11. The first and second waveguides, 3 and 4, each has a striped mesa.

The lower cladding layer 31, which shows the n-type conduction, may be made of InP doped with silicon (Si). The thickness of the lower cladding layer 31 may be about 1 μm. The upper cladding layer 33, which shows the p-type conduction, may be made of InP doped with zinc (Zn) and may have a thickness about 2 μm. The contact layer 34 may be made of GaInAs doped with Zn, which also shows the p-type conduction, and may have a thickness of about 0.2 μm. Thus, these first and second waveguides, 3 and 4, may include a structure of the pn-diode comprised of the lower cladding layer 31, the active layer, and the upper cladding layer 33.

On the contact layer 34 of the first waveguide 3 is formed with the first electrode 6, specifically, the striped region 6a of the first electrode 6; while, on the contact layer 34 of the second waveguide 4 is formed with the striped region 7a of the second electrode 7. Thus, two electrodes, 6 and 7, may come in contact with the contact layer 34.

Rest regions, 11a, 11c and 11d, of the semiconductor substrate 11, and on sides of the first and second waveguides, 3 and 4, are covered with an insulating film 35 which may be made of silicon oxide such as SiO2. While, on the back surface 11g of the substrate 11 is formed with a back electrode 36. This electrode 36 may be made of eutectic metal of AuGe/Ni. The first and second electrodes, 6 and 7, of respective waveguides may show the function of the anode for the pn-junction diode contained in the striped waveguide, while, the back electrode may show the function of the cathode for the pn-junction diode.

The active layer 32 may include the multi quantum well structure which comprises a plurality of well layers and a plurality of barrier layers alternately stacked to each other. In particular, the embodiment shown in FIG. 2 provides two types of well layers whose thicknesses are different from each other. Specifically, the active layer includes the stack of the first well layer/barrier layer/second well layer/barrier layer/first well layer/ . . . a, where the first well layer and the second well layer have respective thicknesses different from the other. Applying a voltage to such active layer, the exciton absorption may resonantly occur at a specific wavelength, and this specific wavelength depends of the applied voltage. The exciton absorption causes a characteristic change in the refractive index thereof. Therefore, setting the bias voltage applied to the active layer in the region A where the refractive index of the active layer shows the positive relation to the bias voltage, that is, the refractive index in the active layer decreases as the bias voltage applied thereto increases, while, setting the bias voltage in a regions B, the refractive index of the active layer increases as the bias voltage increases.

Figure 3A:
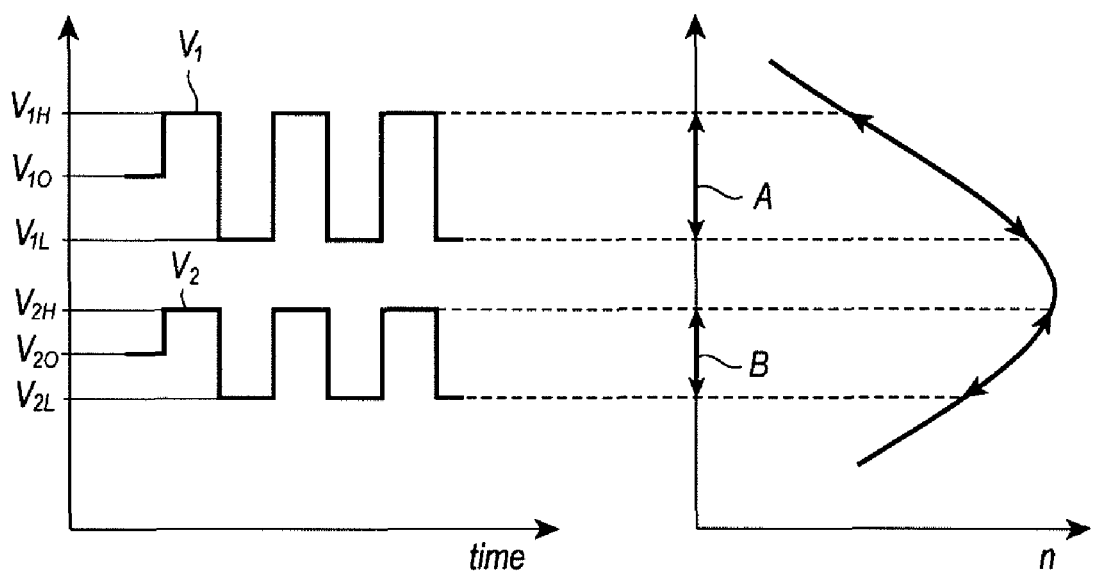
FIG. 3A shows a dependence of the refractive index of the active layer in the optical modulator against the applied bias voltage.
Figure 3B:
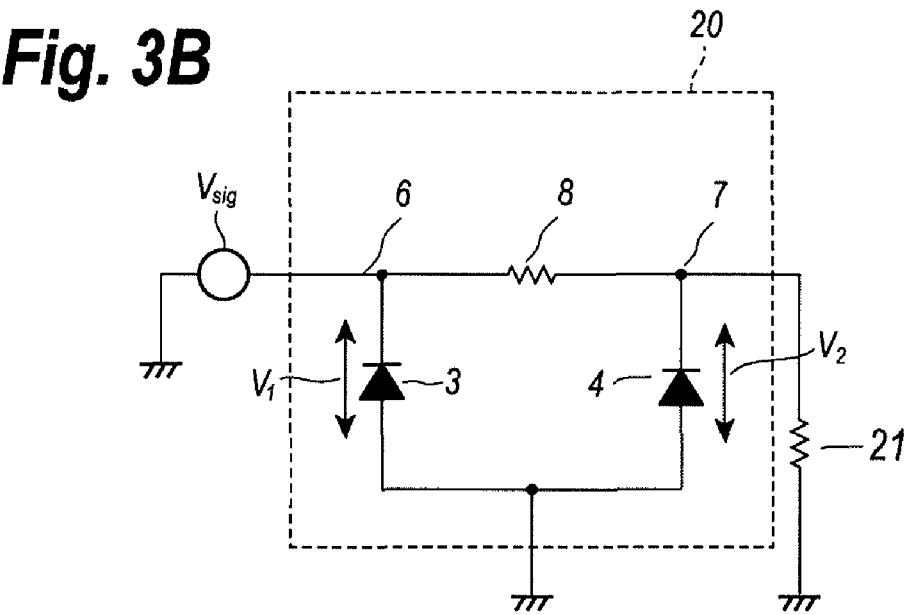
FIG. 3B is an equivalent circuit diagram of the optical modulator shown in FIG. 1.

FIG. 3B is a circuit diagram equivalently denoting the relation between elements formed in the Mach-Zender modulator 20. The first waveguide 3 is biased with the first voltage $V_1$ from the signal source $V_{sig}$ through the first electrode 6; while, the second waveguide 4 is biased with the second voltage $V_2$ through the second electrode 7, which is derived from the first voltage $V_1$ by the resistive divider constituted of the first resistor 8 and the second resistor 21. Assuming the resistance of two resistors, 8 and 21, are $r_1$ and $r_2$; the second voltage $V_2$ is given by:

$$V_2 = \{r_2/(r_1+r_2)\} \times V_1.$$

Accordingly, an optional value for the second voltage $V_2$ to be applied to the second waveguide 4 may be created based on the first voltage $V_1$ by adjusting the resistance of two resistors, 8 and 21. Thus, the first voltage $V_1$ may be set in the first region A where the slope of the absorption coefficient becomes negative, while the second voltage $V_2$ may be set in the second region B where the absorption coefficient of the active layer shows the positive slope.

Figure 4:
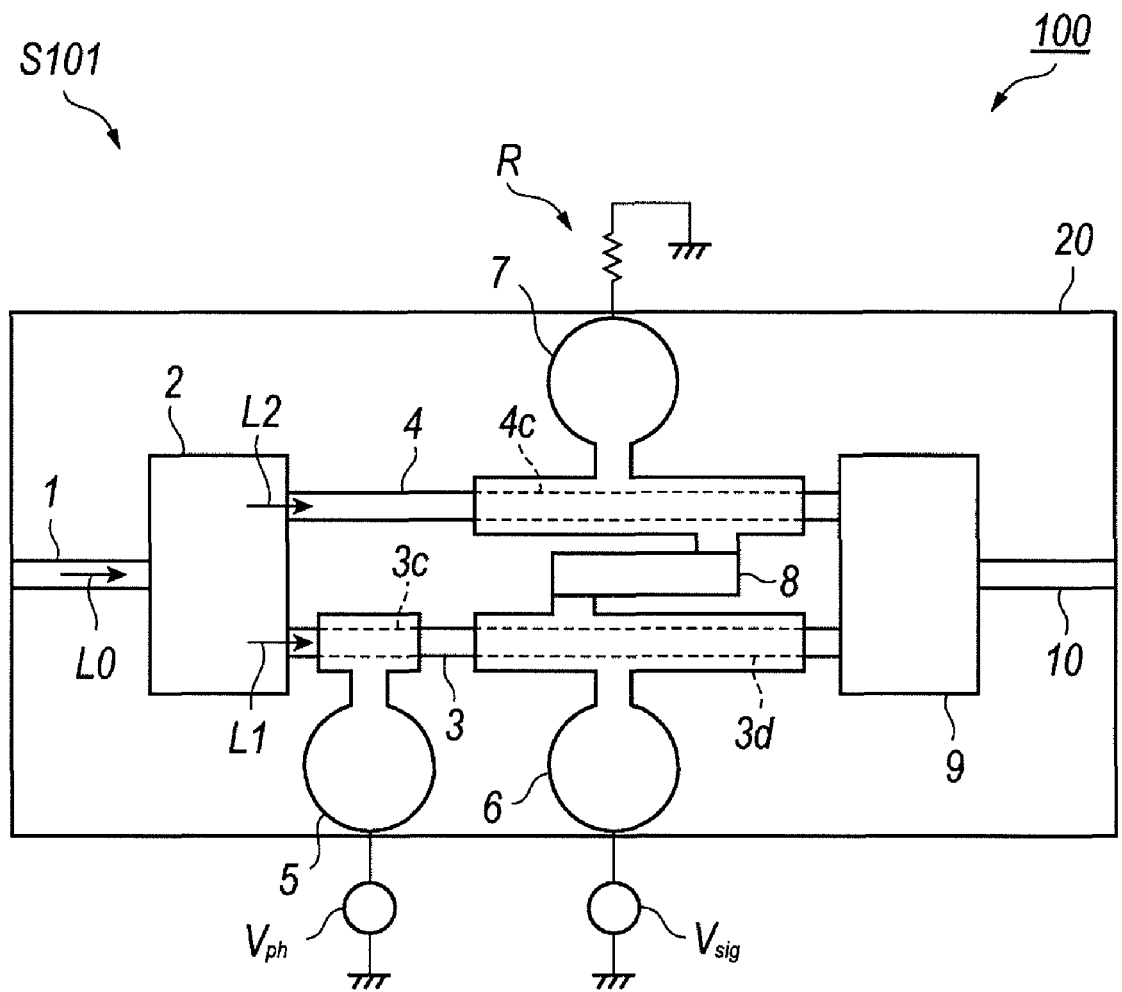
FIG. 4 schematically describes a method to generate modulated light in the optical modulator shown in FIG. 1.

Next, an operation of the Mach-Zender modulator 20 will be described as referring to FIGS. 4 to 6. These figures show primary steps to generate modulated light by the Mach-Zender modulator 20. First, as schematically illustrated in FIG. 4, the input light L0 provided in the input waveguide 1 is de-coupled by the optical de-coupler 2 to generate two light beams, L1 and L2, each provided to the first and second waveguides, 3 and 4, respectively, in step S101.

Figure 5:
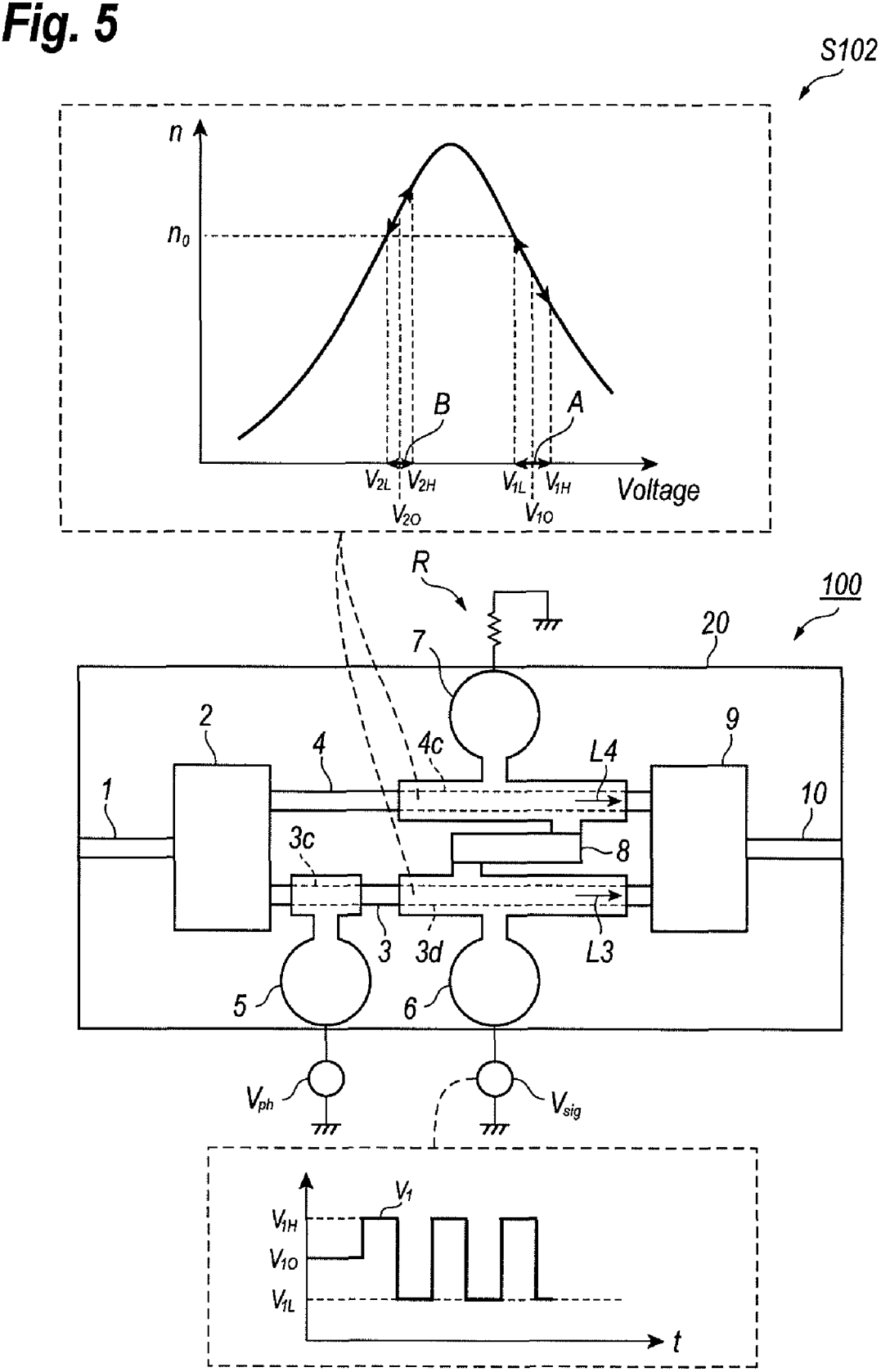
FIG. 5 schematically describes a mechanism to generate modulated light in the optical modulator shown in FIG. 1.

In step S102, the signal source $V_{sig}$ provides the first voltage $V_1$ to the first waveguide 3 through the first electrode 6 as shown in FIG. 5. Concurrently with the application of the voltage signal $V_{sig}$, the second signal $V_2$ is generated by two resistors, 8 and 21, which is applied to the second waveguide 4. Two signals, $V_1$ and $V_2$, have the same phase to each other. Specifically, the first signal $V_1$ is a pulsed (rectangular) signal with an offset voltage $V_{10}$ and an amplitude $(V_{1H}-V_{1L})$, where the peak level $V_{1H}$ and the bottom level $V_{1L}$ of the first signal $V_1$ are both set in the region A in FIG. 5 where the active layer 32 of the first waveguide 3 shows the negative dependence in the refractive index thereof against the applied voltage. Accordingly, the refractive index corresponding to the peak level $V_{1H}$ is less than that corresponding to the bottom level $V_{1L}$.

The second signal $V_2$ also has a rectangular shape whose offset voltage $V_{20}$ is to be set in the region B by two resistors, 21 and 8, where the active layer 32 in the second waveguide 4 in the refractive index thereof shows the positive dependence against the applied voltage. That is, the refractive index of the active layer 32 becomes larger when the second voltage $V_2$ is in the peak level $V_{2H}$, which corresponds to the status where the first voltage is in the peak level $V_{1H}$. While, when the second signal is in the bottom level $V_{2L}$, where the first signal $V_{1L}$ is also in the bottom level $V_{1L}$, the refractive index of the active layer 32 of the second waveguide 4 becomes the reference index n0. Thus, the refractive index of the active layer 32 in the first waveguide 3 and that of the second waveguide 4 oppositely behave with respect to the applied signal.

At step S102, the first signal $V_1$ is applied to the first waveguide 3, while, the second signal $V_2$ is applied to the second waveguide 4, which changes the refractive index of respective waveguides accordingly and shifts the phase of the light beams, L1 and L2 to convert the light beams, L3 and L4.

When the first and second signals, $V_1$ and $V_2$, are in the bottom level, the refractive index of the active layer in respective active layers 32 become the reference $n_0$, accordingly, the phase shift of the de-coupled light L1 and that of the light L2 become equal to each other. The magnitude of the modulated light which couples these two light beams, L1 and L2, becomes substantially equal to the incident beam L0, which realized the "ON" state of the output light.

On the other hand, when two signals, $V_1$ and $V_2$, are in respective peak levels, the first light L1 and that of the second light L2 show the opposite phase shift, because the refractive index of the active layer in the first waveguide 3 and that of the second waveguide 4 oppositely behave against the applied voltage. Then, the magnitude of the output light coupling the third and fourth light beams, L3 and L4, becomes less than that of the incident light L0, which realizes the "OFF" state.

Figure 6:
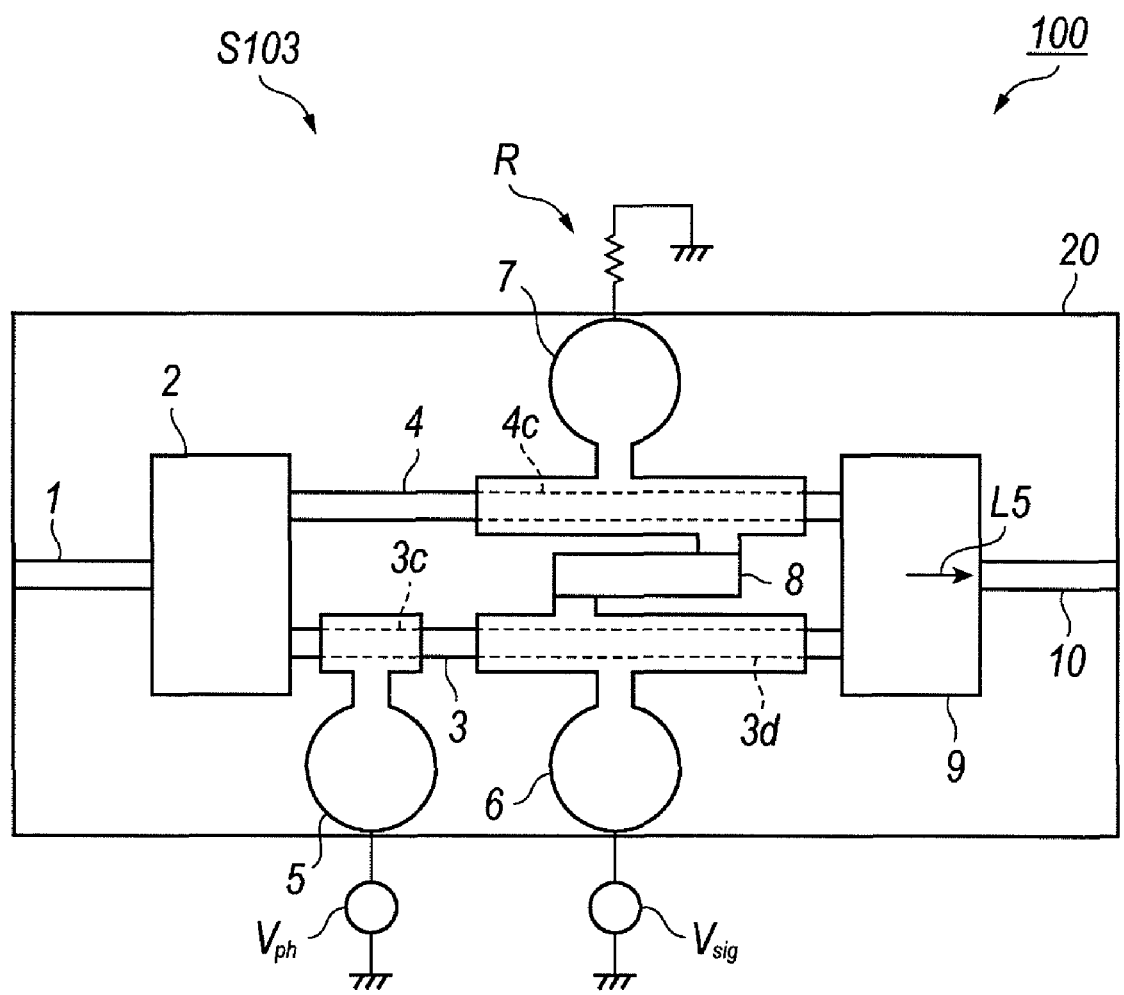
FIG. 6 schematically describes a mechanism to generate modulated light subsequent to that shown in FIG. 4.

At step S103, the optical coupler 9 couples the light beam L3 and the light beam L4 to generate the modulated light L5, as shown in FIG. 6. In a modification, the electrode 5 that applies a static voltage in the first region 3c of the first waveguide 3 may shift the phase of the light beam propagating therein by varying the refractive index of the first region 3c. Thus, the electrode 3 may finely adjust the phase difference between the light beam L3 and the light beam L4, which may enhance the modulation degree of the light beam L5.

Figure 7:
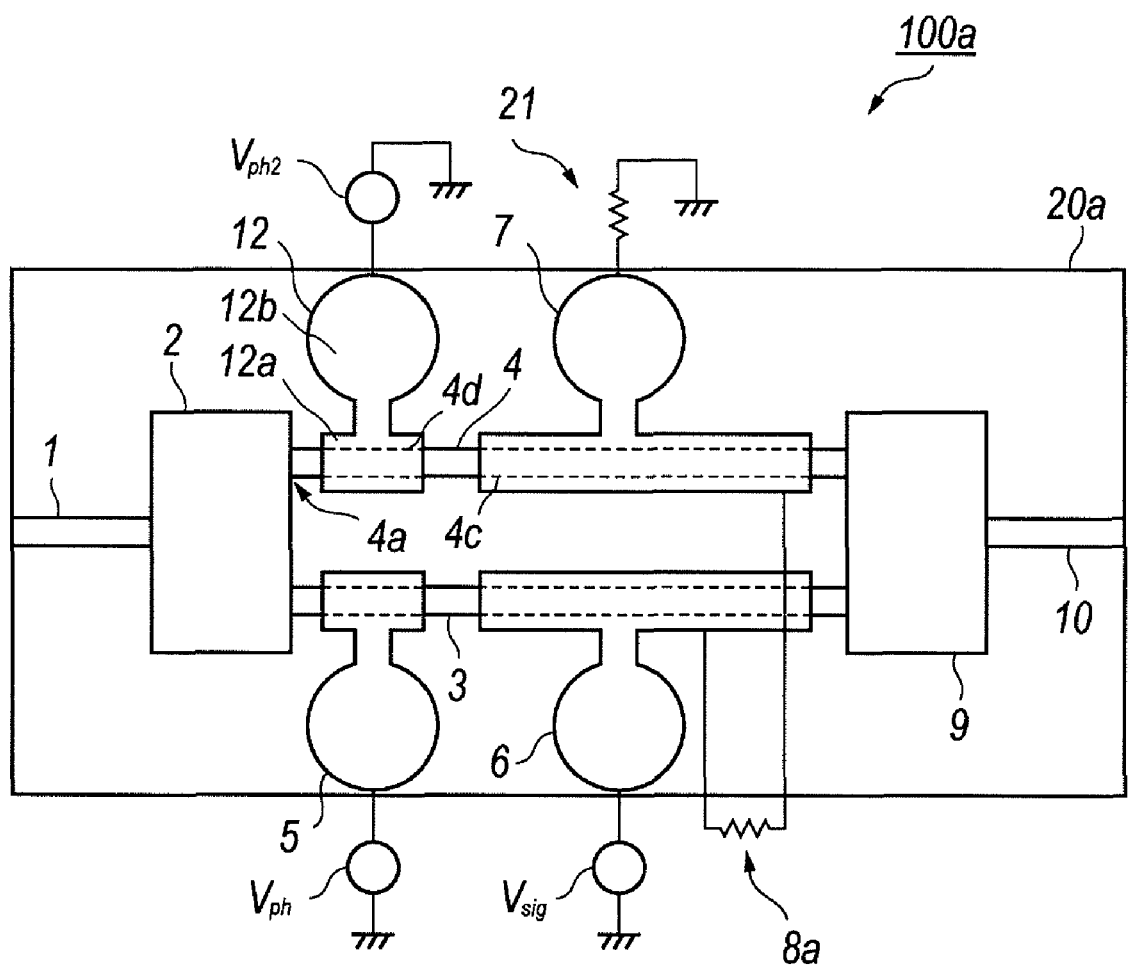
FIG. 7 is a plan view schematically showing an optical modulator according to another embodiment of the invention.

The optical modulator according to the present invention is not restricted to the embodiment above described; for instance, an optical modulator having the arrangement shown in FIG. 7 may be applicable, in which FIG. 7 is a schematic plan view of the optical modulator 100a according to the second embodiment of the invention.

The optical modulator 100a provides, in stead of the aforementioned optical device 20 with the Mach-Zender arrangement, another optical device 20a and the second resistor 21, and the second voltage source $V_{ph2}$. Other arrangements of the device 100a are the same as those of the aforementioned device 100.

The second electrode 12 for the second voltage source $V_{ph2}$ is formed in a region on the second waveguide 4 corresponding to the position of the electrode 5 on the first waveguide 3. This electrode 12 includes a striped portion 12a and a pad portion 12b. The striped portion 12a covers the second region 4d between the edge 4a and the first region 4c of the second waveguide 4. The second voltage source $V_{ph2}$ is coupled with the second electrode 12 through the pad portion 12b thereof to apply the additional bias voltage to the second region 4d. The first resistor 8a is coupled between the first and second electrodes, 6 and 7, but disposed outside of the optical device 20a.

The optical modulator 100a provides the second resistor 21 between the second electrode 7 and the ground, and the first resistor 8a between the first and second electrodes, 6 and 7. Accordingly, applying the signal $V_{sig}$ to the first electrode 6, a portion $V_2$ of the signal $V_{sig}$ divided by two resistors, 8a and 21, is applied to the second electrode 7 as the second signal $V_2$; while, the rest portion of the signal, $V_{sig}-V_2$, is applied to first electrode 6 as the first signal $V_1$. Thus, two signals, $V_1$ and $V_2$ may be provided from the single voltage source.

The optical modulator with the Mach-Zender type of the present embodiment further provides the electrode 12 on the second waveguide 4 to control the phase of the light propagating therein, which may enhance the modulation degree of the light output from the optical modulator 100a.

Next, a specific example according to the present invention will be described. Semiconductor layers contained in the device each has specifications listed in the following table:

| Layer | material | thickness |
|---|---|---|
| Semiconductor substrate 11 | n-type Si doped InP | |
| lower cladding layer 31 | n-type Si doped InP | 1.0 μm |
| upper cladding layer 32 | p-type Zn-doped InP | 2.0 μm |
| contact layer 34 | p-type Zn-doped GaInAs | 0.2 μm |

The first and second electrodes are made of stacked metal of titanium (Ti), platinum (Pt) and gold (Au), while, the back electrode is made of AuGe eutectic metal and nickel (Ni). The resistor 8 has a type of thin-film resistor made of alloy of nickel (Ni) and chromium (Cr). The insulating film is silicon di-oxide ($SiO_2$).

Figure 8:
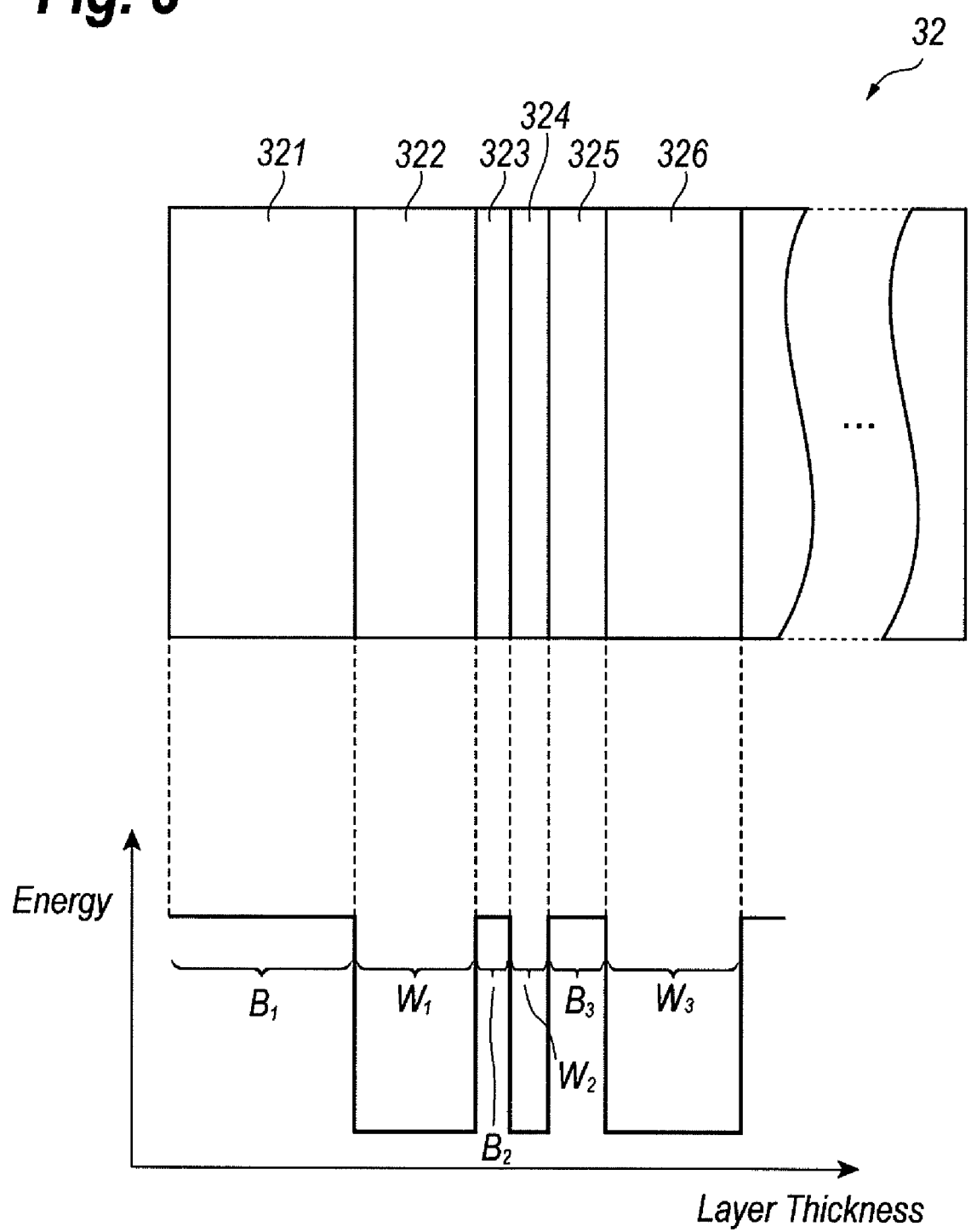
FIG. 8 shows an arrangement and an energy band structure of the active layer in the optical modulator shown in FIG. 2.

The active layer 32 of the optical modulator 20 according to the present invention will be further described as referring to FIG. 8, which shows a layer structure of the active layer 32 and a band diagram of the active layer 32.

The active layer 32 includes a set of layers of the first barrier layer 321, the first well layer 322, the second barrier layer 323, the second well layer, 324, the third barrier layer 325 and the third well layer 326, where these layers are stacked on the lower cladding layer 31 in this order. The active layer 32 includes twelve (12) sets of this unit set comprised of the layer, 321 to 326.

Each barrier layer, 321, 323 and 324, forms the quantum barrier, B1, B2 and B3; while, each well layer, 322, 324 and 346, forms the quantum well, W1, W2 and W3, to form the multi quantum well structure, in particular, the arrangement shown in FIG. 8, is called as the five-layer asymmetric coupled quantum well (FACQW) structure. Respective layers in the active layer 32 have the characteristic listed in the following:

| layer | Material | Thickness |
|---|---|---|
| 1st barrier layer 321 | In0.52Al0.48As | 10 nm |
| 1st well layer 322 | In0.52Al0.47As | 4.4 nm |
| 2nd barrier layer 323 | In0.52Al0.48As | 0.88 nm |
| 2nd well layer 324 | In0.52Al0.47As | 1.17 nm |
| 3rd barrier layer 325 | In0.52Al0.48As | 2.25 nm |
| 3rd well layer 326 | In0.52Al0.47As | 5.58 nm |

Thus, the active layer 32 of the present example has tree well layers, 322, 324 and 326, among which the third well layer 236 is the thickest, while, the second well layer 324 between other two well layers, 322 and 326, is the thinnest. Among three barrier layers, 321, 323 and 325, the first barrier layer 321 is the thickest, while, the second barrier layer 323 between other two barrier layers, 321 and 325, is the thinnest. Accordingly, the thinnest barrier layer, the second barrier layer 323, divides the thinnest well layer, the second well layer 324, from the first well layer 322. Moreover, a total thickness of the first well layer 322 and the second well layer 324 is substantially equal to the thickness of the rest well layer, the third well layer 326.

Figure 9:
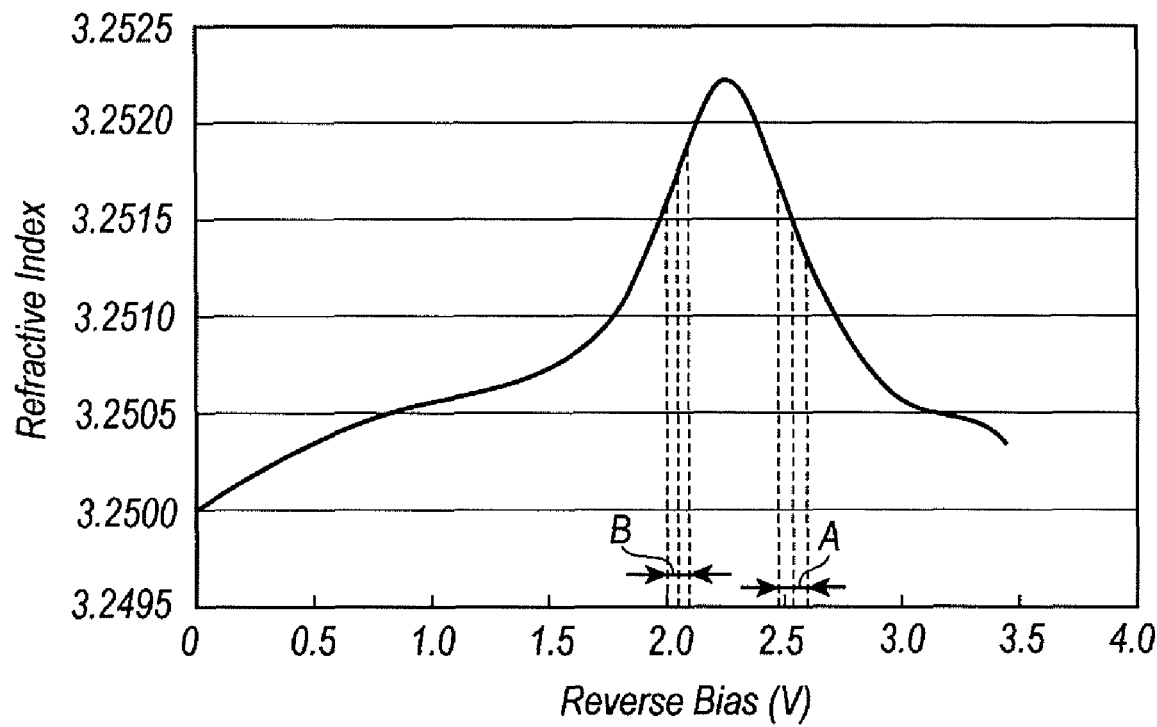
FIG. 9 shows a dependence of the refractive index of the active layer shown in FIG. 8 against the applied reverse bias.

The active layer 32 thus configured as described above shows the dependence of the refractive index thereof on the applied reverse bias as shown in FIG. 9. In FIG. 9, the horizontal axis corresponds to the bias voltage applied to the active layer 32, while, the vertical axis shows the refractive index of the active layer 32.

The refractive index monotonically increases for the bias voltage up to about 2.2 V, while, it monotonically decreases in a region of the bias voltage over 2.2 V. In other words, the refractive index shows the positive dependence on the bias voltage in a bias range from 0 to 2.2 V, while, it shows the negative dependence in another bias range from 2.2 to 3.5 V. In particular, the refractive index of the active layer 32 shows a steep positive behavior against the bias voltage around 2.0 V and a steep negative dependence around 2.5 V.

A signal $V_1$ with the full amplitude of 0.13 V, which corresponds to $V_{1H}$-$V_{1L}$, in FIG. 5, was provided to the device 20 with the offset bias of 2.54 V. Under these conditions, the signal $V_1$ is set in the range A in FIG. 9 where the refractive index of the active layer 32 shows a steep negative dependence on the bias voltage. Setting the resistance of two resistors, 21 and 8, to be 10.5 and 39.5Ω, respectively, the second signal $V_2$ applied to the second waveguide 4 is set in the range B where the refractive index shows a steep positive dependence on the bias voltage.

Figure 10:
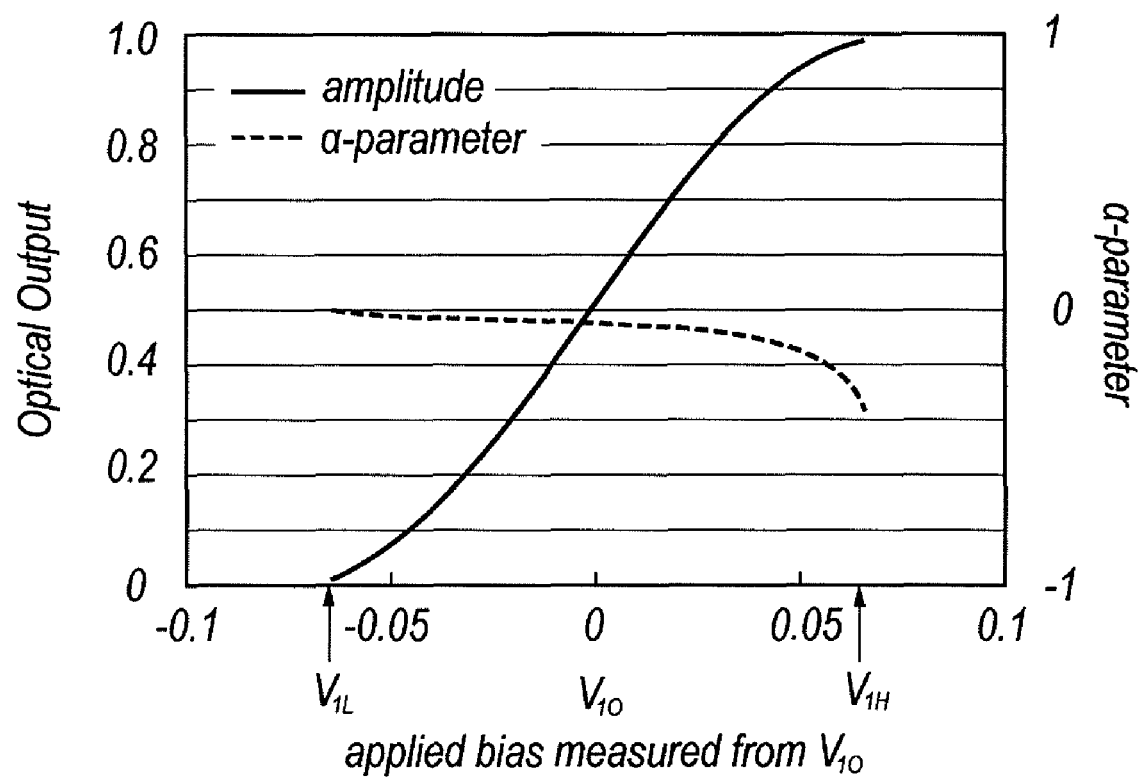
FIG. 10 shows measurement results of the optical modulator shown in FIG. 1.

The light output from the device 20 was measured which is shown in FIG. 10. In FIG. 10, the horizontal axis denotes the signal $V_s$ measured from the offset voltage $V_{10}$ of the first signal $V_1$, that is, a condition where the signal $V_s$ is zero corresponds to the offset voltage of the signal $V_1$. The vertical axis in FIG. 10 denotes the optical output obtained from the device 20. Referring to FIG. 5, when the first signal $V_1$ is set to be $V_{1H}$, the second signal $V_2$ becomes $V_{2H}$, where the difference in the refractive index of two waveguides, 3 and 4, is the maximum and the coupled light output from the device 20 disappears, that is, the optical output in FIG. 10 should be zero. Because the electrode 5 provided in the first waveguide 3 may shift the phase of the light beam propagating therein, the measurement described above was carried out in a condition where the phase difference between the light propagating in the first waveguide 3 and that in the second waveguide becomes 90° at which the optical output from the device 20 becomes 0.5.

FIG. 10 also shows, what is called, the α-parameter that denotes one parameter of the chirping appeared in the modulated light. A condition where the α-parameter is zero means that the modulated light involves no chirping. As shown FIG. 10, the α-parameter may be suppressed to be substantially zero in a range of the signal voltage from −0.05 to 0.05 V. Thus, according to the present embodiment for the semiconductor optical modulator with the Mach-Zender type, the modulated light with substantially no chirping may be obtained by adjusting the offset bias voltage applied to the first and second electrodes and setting the modulation signal within 0.1 V.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

I claim:

1. A semiconductor optical modulator with a Mach-Zender type having a semiconductor substrate, an optical de-coupler, an optical coupler, and first and second waveguides each provided on said semiconductor substrate and optically coupled with said optical de-coupler and said optical coupler, said optical modulator further comprising:
    a first resistor connecting said first waveguide and said second waveguide; and
    a second resistor for grounding said second waveguide, wherein said first and second resistors are connected in series,
    wherein said first waveguide is provided with a driving signal superposed with a first bias voltage, and said second waveguide is biased by a second bias voltage generated by a resistive divider constituted of said first and second resistors.

2. The semiconductor optical modulator of claim 1,
    wherein said first waveguide includes a multi-quantum well structure and said second waveguide includes a multi-quantum well structure whose layer arrangement is same with a layer arrangement of said multi-quantum sell structure of said first waveguide,
    wherein said first waveguide is biased in a region where a refractive index of said first waveguide shows negative dependence on said first bias voltage and said second waveguide is biased in another region where a refractive index of said second waveguide shows positive dependence on said second bias voltage.

3. The semiconductor optical modulator of claim 2,
    wherein said multi-quantum well structure of said first and second waveguides has a five-layer asymmetric coupled quantum well structure.

4. The semiconductor optical modulator of claim 3,
    wherein said five-layer asymmetric coupled quantum well structure includes at least three well layers, two of which has a total thickness substantially equal to a thickness of a rest well layer.

5. The semiconductor optical modulator of claim 2,
    wherein said multi-quantum well structure of said first and second waveguides shows a peak in said refractive index of said first and second waveguides against said bias voltage,
    wherein said first bias voltage is set in a negative slope side with respect to said peak and said second bias voltage is set in a positive slope side with respect to said peak.

6. The semiconductor optical modulator of claim 1,
    wherein one of said first and second waveguides provides an additional electrode to be supplied with a static bias voltage to shift a phase of light propagating in said one of said first and second waveguides providing said extra waveguide.

7. The semiconductor optical modulator of claim 6,
    wherein other of said first and second waveguides not providing said additional electrode provides another electrode to shift a phase of light propagating in said another one of said first and second waveguides.

8. The semiconductor optical modulator of claim 1,
    wherein at least said first resistor is integrally formed on said semiconductor substrate.

9. The semiconductor optical modulator of claim 8,
    wherein said first resistor is a thin film resistor integrally formed on said semiconductor substrate.

10. A method to generate a modulated light by a semiconductor optical modulator with a Mach-Zender type having an optical de-coupler, an optical coupler, and first and second waveguides each connected to said optical de-coupler in an end and connected to said optical coupler in another end, said method comprising steps of:
    generating first and second light each de-coupled by said optical de-coupler from incident light, said first light being provided to said first waveguide and said second light being provided to said second waveguide;
    applying a first bias voltage to said first waveguide to generate third light and a second bias voltage different from said first bias voltage to said second waveguide to generate fourth light;
    generating output light by coupling said third light with said fourth light by said optical coupler,
    wherein said second bias voltage is generated from said first bias voltage by a resistive divider constituted of a first resistor connecting said first waveguide to said second waveguide and a second resistor grounding said second waveguide.

11. The method of claim 10,
    wherein said first bias voltage is set in a range where a refractive index of said first waveguide shows negative dependence on said first bias voltage, and said second bias voltage is set in another range where a refractive index of said second waveguide shows positive dependence on said second bias voltage.

12. The method of claim 10,
    wherein said optical modulator further provides a electrode on at least one of said first and second waveguides to shift a phase of one of said third and fourth light propagating in one of said first and second waveguides providing said electrode,
    wherein said method further comprises a step of applying an extra bias voltage to said electrode.

* * * * *